(12) United States Patent
Heilman (10) Patent No.: US 8,863,765 B2
(45) Date of Patent: Oct. 21, 2014

(54) ADJUSTABLE TREE STAND HUNTING BLIND

(71) Applicant: Darwin Heilman, Wixom, MI (US)

(72) Inventor: Darwin Heilman, Wixom, MI (US)

( * ) Notice: Subject to any disclaimer, the term of this patent is extended or adjusted under 35 U.S.C. 154(b) by 22 days.

(21) Appl. No.: 13/693,112

(22) Filed: Dec. 4, 2012

(65) Prior Publication Data

US 2014/0150835 A1    Jun. 5, 2014

(51) Int. Cl.
*E04H 15/14* (2006.01)
*A01M 31/02* (2006.01)

(52) U.S. Cl.
CPC ........... *A01M 31/025* (2013.01); *Y10S 135/901* (2013.01)
USPC ................ 135/90; 135/96; 135/901; 182/187

(58) Field of Classification Search
USPC ...................... 135/90, 96, 116, 117, 119, 901; 182/187–188, 133–136; 248/230.8–230.9, 218.4, 219.3
See application file for complete search history.

(56) References Cited

U.S. PATENT DOCUMENTS

| | | | |
|---|---|---|---|
| 2,594,410 A | 4/1952 | Feldpausch | |
| 3,116,808 A * | 1/1964 | Riley | 182/129 |
| 3,358,789 A * | 12/1967 | Laun | 182/113 |
| 3,690,334 A | 9/1972 | Miller | |
| 3,990,536 A * | 11/1976 | Wilburn | 182/20 |
| 4,134,474 A * | 1/1979 | Stavenau et al. | 182/187 |
| 4,951,696 A | 8/1990 | Jones, Sr. | |
| 5,062,234 A | 11/1991 | Green | |
| 5,279,390 A | 1/1994 | Phillips | |
| 5,377,711 A | 1/1995 | Mueller | |
| 5,482,137 A * | 1/1996 | McNeill | 182/187 |
| 5,613,512 A | 3/1997 | Bean | |
| 5,669,403 A | 9/1997 | Belcher et al. | |
| 6,243,979 B1 | 6/2001 | Seats et al. | |
| 6,434,877 B1 | 8/2002 | Shelton | |
| 6,499,496 B1 * | 12/2002 | Young | 135/90 |
| 6,510,922 B1 | 1/2003 | Hodnett | |
| 7,182,091 B2 | 2/2007 | Maddox | |
| 7,219,680 B1 | 5/2007 | Gresock | |
| 7,222,634 B2 | 5/2007 | Hess et al. | |
| 7,556,052 B2 | 7/2009 | Wright et al. | |
| 7,735,503 B2 * | 6/2010 | Jenkinson | 135/96 |
| 7,958,968 B1 | 6/2011 | Stabler | |
| 7,971,685 B2 * | 7/2011 | Simone et al. | 182/133 |
| 8,500,141 B2 * | 8/2013 | Chase | 280/47.18 |
| 2006/0249640 A1 * | 11/2006 | Hanson | 248/214 |
| 2007/0017744 A1 | 1/2007 | Jacks | |
| 2012/0168249 A1 * | 7/2012 | Furseth et al. | 182/113 |

* cited by examiner

*Primary Examiner* — Winnie Yip
(74) *Attorney, Agent, or Firm* — Dickinson Wright PLLC (57) ABSTRACT

An adjustable blind apparatuses for attaching to a support that extends from the ground. The blind apparatus includes a frame that has a frame rear portion for engaging the support with a frame coupling to brace the frame against the support. The frame further includes a frame front portion that is spaced from the frame rear portion, and a curtain that is coupled with the frame. An adjustment member extends between a stationary surface and the frame front portion for moving the frame front portion between various positions to adjust the distance between the curtain and the ground, and to reinforce the front frame front portion. The adjustment member includes a first leg for engaging the stationary surface, and a second leg in telescoping relationship with the first leg that includes a mounting coupling interconnecting the second leg and the frame front portion.

7 Claims, 6 Drawing Sheets

ADJUSTABLE TREE STAND HUNTING BLIND

BACKGROUND OF THE INVENTION

1. Field of the Invention

An adjustable blind apparatus for attaching to a support.

2. Description of the Prior Art

Various configurations of blind apparatuses are known in the art for attaching to trees, or other supports, that extend from the ground. Such blind apparatuses typically are set up such that they are disposed about an elevated seating or standing platform, such as a hunting tree stand, to conceal the user with a camouflage-patterned curtain and to act as a barrier from the elements during outdoor activities like hunting.

One such blind apparatus is disclosed in U.S. Pat. No. 7,556,052. The blind apparatus includes a frame that has a frame rear portion that engages a tree with a frame coupling to brace the frame against the tree in a direction generally perpendicular to the tree. The frame further includes a frame front portion that is spaced from the frame rear portion, and a curtain that is coupled with the frame for hanging in a downward direction from the frame to conceal the user.

Known issues with such blind apparatuses are that the front portion tends to be incapable of supporting relatively heavy loads, like the weight of a firearm or the weight of a user leaning against it. Additionally, such hunting blinds are not easily adaptable for concealing users of different heights.

SUMMARY OF THE INVENTION

The invention provides for such a blind apparatus that further includes an adjustment member that has a first leg for engaging a stationary surface, and a second leg in telescoping relationship with the first leg that includes a mounting coupling interconnecting the frame front portion and the second leg for moving the frame front portion between various positions to adjust the distance between the curtain and the ground to reinforce the front frame front portion.

Thus several advantages of one or more aspects of the invention are that the adjustment member is able to support loads on the frame front portion while being easily adjustable to move the front portion and curtain to conceal and act as a barrier from the elements for users of different heights. Additionally, the invention is simple in design, providing an inexpensive blind that is easy to assemble and transport.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Referring to the Figures, wherein like numerals indicate corresponding parts throughout the several views, an adjustable blind apparatus 20 is generally shown for attaching to a support 22, such as a tree, extending away from a ground along a vertical axis A. It should be appreciated that the adjustable blind apparatus 20 can be used for various applications including use as a hunting blind, observation blind, or privacy blind for campers.

Figure 1:
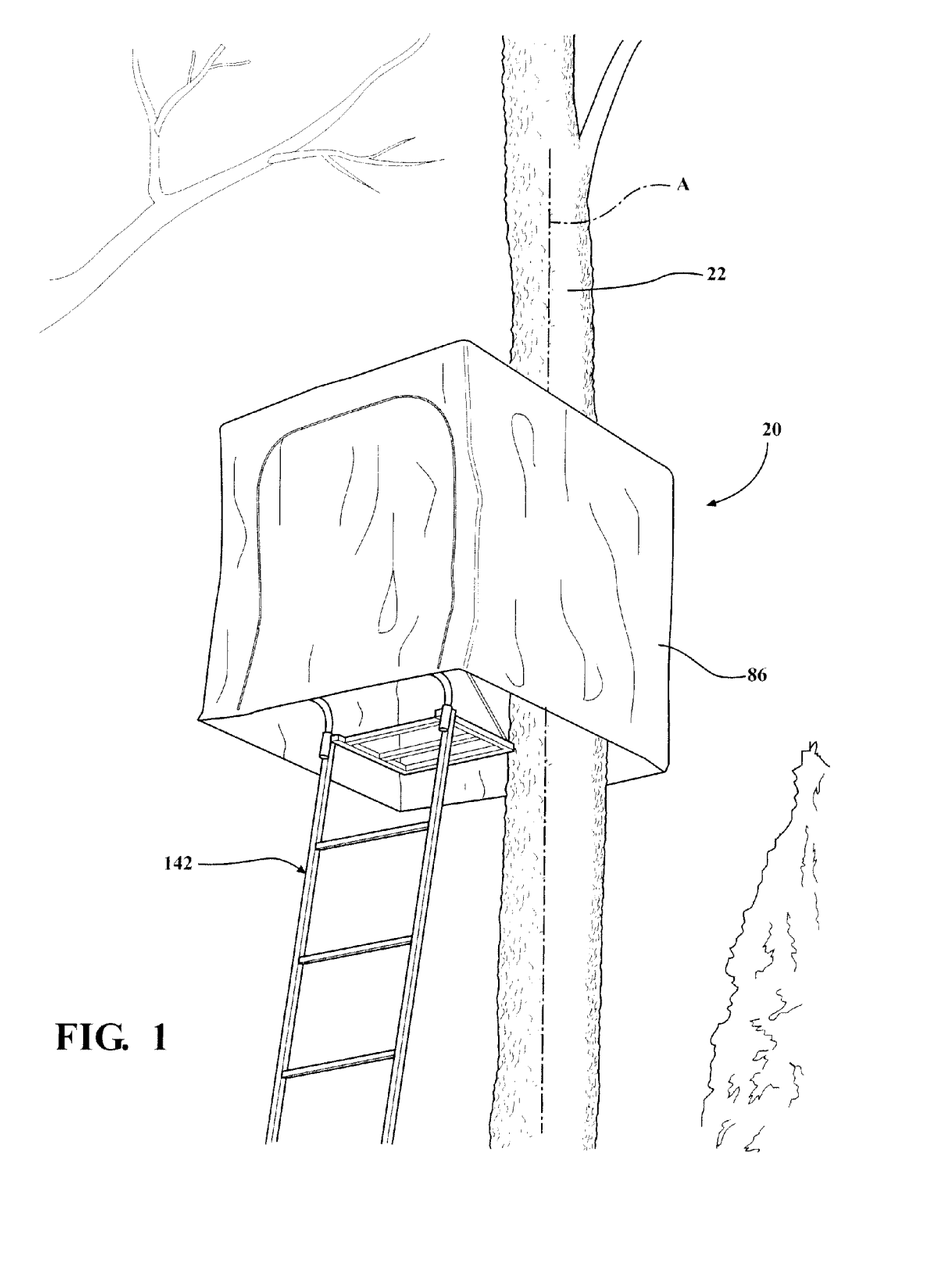
FIG. 1 is a front perspective view of the adjustable blind apparatus coupled with a support.
Figure 2:
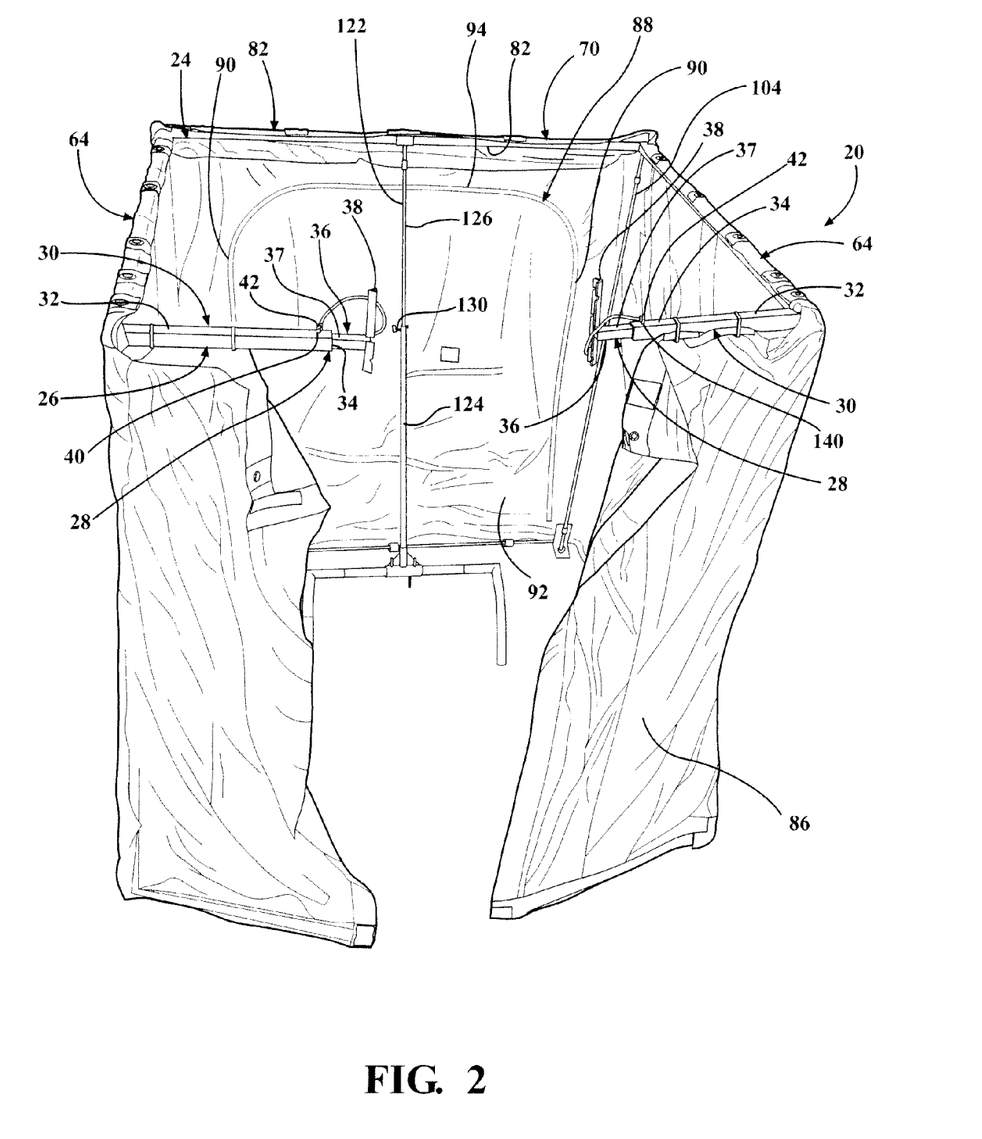
FIG. 2 is a rear perspective view of the adjustable blind apparatus unattached.
Figure 3:
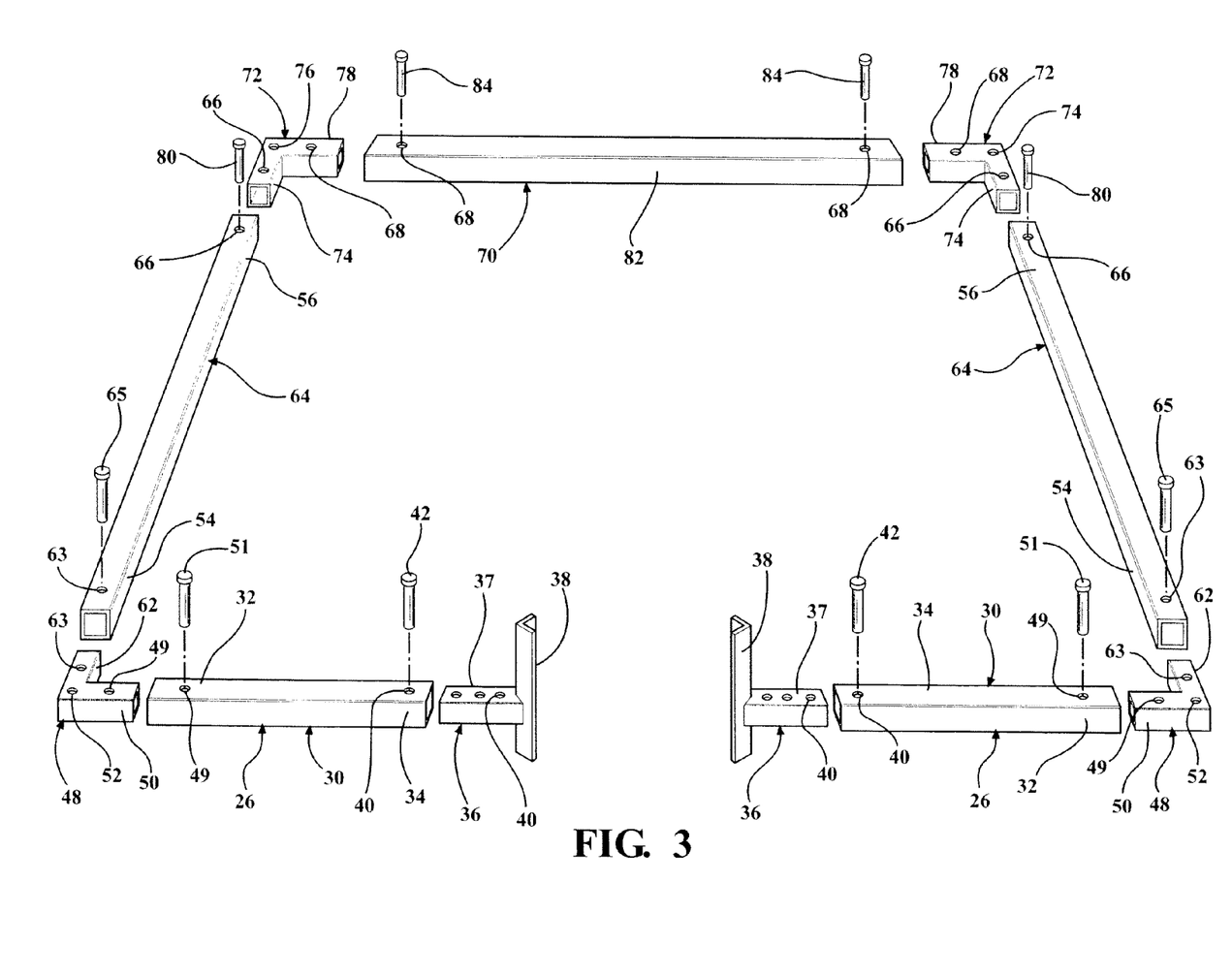
FIG. 3 is a perspective view of the frame coupling coupled with a support.

As best presented in FIGS. 2 and 3, the adjustable blind apparatus 20 includes a frame 24 for providing rigidity to the hunting blind apparatus 20. The frame 24 includes a frame rear portion 26 that includes a frame coupling 28 for engaging the support 22 to brace the frame 24 against the support 22 in a direction generally perpendicular to the vertical axis A. The frame coupling 28 includes a pair of tubular-shaped rear horizontal members 30 that have a generally rectangular-shaped cross-section for extending perpendicular to the vertical axis A on opposing sides of the support 22, from a first rear horizontal member portion 32 toward the support 22, to a second rear horizontal member portion 34. It should be appreciated that the rear horizontal members 30 could have other shapes, e.g. circular cross-section. The frame coupling 28 further includes a pair of brace members 36 each telescopingly and removeably extending out of one of the rear horizontal members 30 from the second rear horizontal member portion 34. The brace members 36 each include a brace member leg portion 37 and a claw portion 38 that extend perpendicular to the brace member leg portion 37 for adjustably engaging the support 22 to fix the hunting blind apparatus 20 to the support 22. In other words, the claw portions 38 adjustably extend from the rear horizontal members 30, such that the frame coupling 28 is adjustable to engage supports 22 that have different widths, e.g. different-sized trees.

Each of the rear horizontal members 30 and the brace members 36 telescopingly extending therefrom define a plurality of brace orifices 40 for alignment with one another during extension of the brace members 36 from the horizontal members 30. The frame coupling 28 further includes a brace pin 42 that removeably extends through one of the pairs of aligned brace orifices 40 for securing the brace members 36 and rear horizontal members 30 in an aligned position relative to one another. In other words, the brace pin 42 is inserted through a pair of aligned brace orifices 40 after adjustment of the rear horizontal members 30 and the brace members 36 to lock them in place relative to one another.

Figure 4:
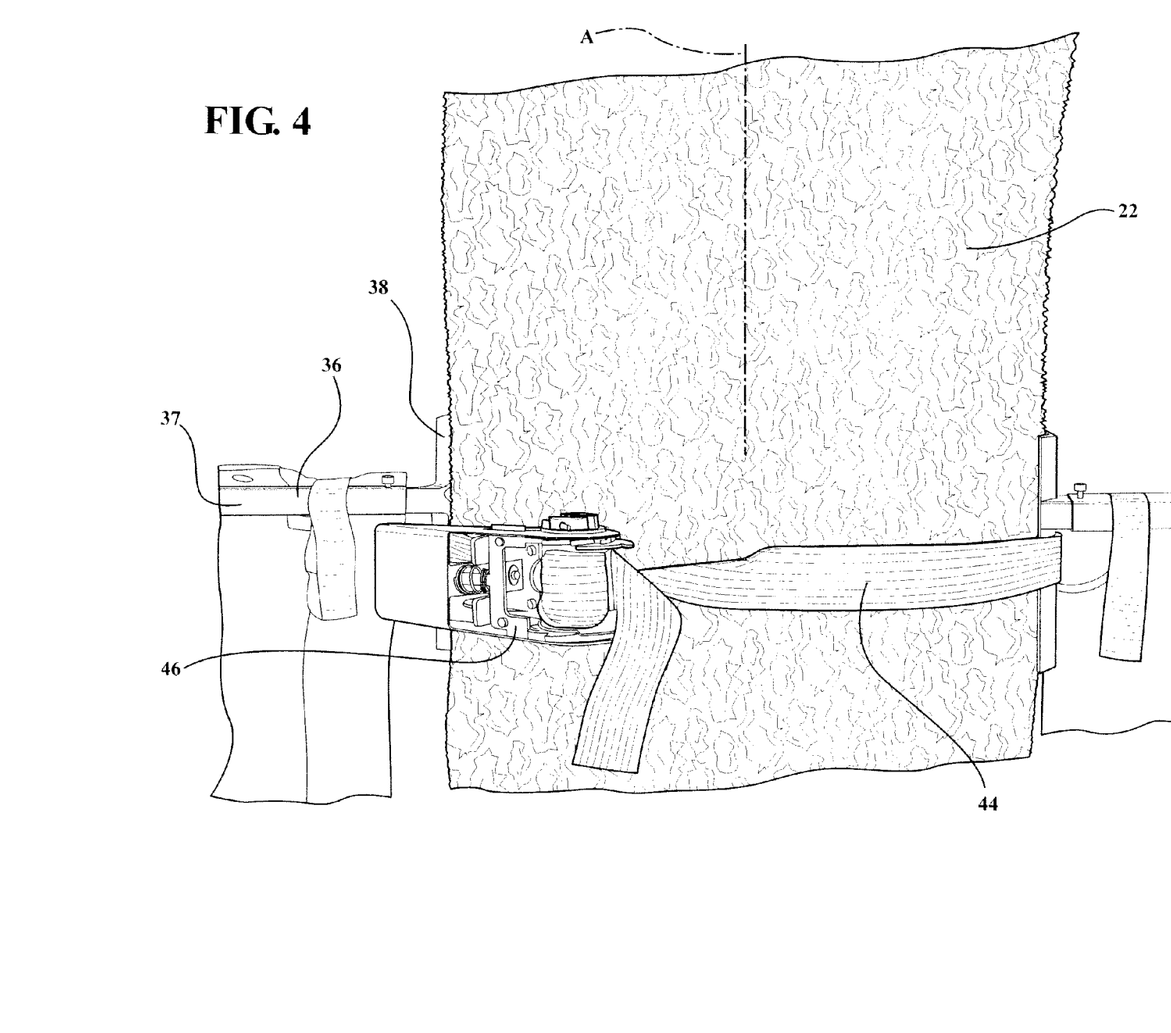
FIG. 4 is a top exploded view of the frame.

As best presented in FIG. 4, the frame coupling 28 further includes a strap 44 for wrapping about the support 22 and the claw portions 38 to prevent the brace members 36 from moving relative to the support 22. A ratchet 46 is coupled with the strap 44 for tightening the strap 44 about the brace members 36 and the support 22. It should be appreciated that the frame coupling 28 could include other means for bracing the frame 24 against the support 22, e.g. screws.

As best presented in FIG. 3, the frame rear portion 26 further includes a pair of L-shaped rear corner mounts 48 that each include a rear corner mount horizontal leg 50 for removeably extending into one of the first rear horizontal member portions 32. Each rear corner mount horizontal leg 50 and the first rear horizontal member portion 32 receiving the rear corner mount leg 50 define a pair of horizontal leg orifices 49 for alignment with one another. A horizontal leg pin 51 removeably extends through each set of aligned horizontal leg orifices 49 for securing the rear corner mount horizontal leg 50 and the first rear horizontal member portions 32.

The rear corner mounts 48 each further define a rear upper vertical receiving aperture 52 for extending parallel to the vertical axis A when the rear corner mount horizontal leg 50 receives one of the first rear horizontal member portions 32 and a rear corner mount forward leg 62 that extends perpendicular to the rear corner mount horizontal leg 50 and the rear upper vertical receiving aperture 52.

The frame 24 further includes a pair of tubular-shaped forward members 64, each having a and a rectangular-shaped cross-section, that extend from a first forward member portion 54 that is coupled with the frame coupling 28 to a second forward member portion 56. Specifically, each of the first forward member portions 54 removeably receive a rear corner mount forward leg 62 of one the rear corner mounts 48. It should be appreciated that the forward members 64 could have other shapes, e.g. circular cross-section. Each of the rear corner mount forward legs 62 and the first forward member portion 54 receiving the rear corner mount forward leg 62 define a rear securement orifice 63 for alignment with one another. A rear securement pin 65 removeably extends through the aligned rear securement orifices 63 of each of the rear corner mount forward legs 62 and the forward members 64 receiving the rear corner forward mount legs 62 for securing the rear corner mount 48 to the forward member 64.

The frame 24 further includes a frame front portion 70 spaced from the frame rear portion 26 by the forward members 64. The frame front portion 70 includes a pair of L-shaped front corner mounts 72 that each include a front corner mount forward leg 74 for extending into the second forward member portion 56 of one of the forward members 64. The front corner mounts 72 further each include a front upper vertical receiving aperture 76 for extending parallel to the vertical axis A when the front corner mount forward leg 74 extends into the second forward member portion 56. The front corner mounts 72 further each include a front corner mount horizontal leg 78 that extends perpendicular to the front corner mount forward leg 74 and the front upper vertical receiving aperture 76. Each of the front corner mount forward legs 74 and the forward members 64 receiving the front corner mount forward legs 74 define a front securement orifice 66 for alignment with one another. A front securement pin 80 removeably extends through the aligned front securement orifices 66 of each of the front corner mount forward legs 74 and the forward members 64 receiving the front corner mount legs 74 for securing the front corner mount 72 to the forward member 64.

The frame front portion 70 further includes a tubular-shaped front rest member 82 that has a rectangular cross-section and removeably receives and extends between the front corner mount horizontal legs 78 of the front corner mounts 72. It should be appreciated that the front rest member 82 could have other shapes, e.g. circular cross-section. The front rest member 82 can be used as a general support surface or firearm rest when the adjustable blind apparatus 20 is used for hunting applications. Each of the front corner mounts 72 and the front rest member 82 extending therefrom define a horizontal securement orifice 68 for alignment with one another. A horizontal securement pin 84 removeably extends through the horizontal securement orifices 68 of each of the front corner mounts 72 and the front rest member 82 extending therefrom for securing the front corner mount 72 to the front rest member 82.

As best presented in FIG. 2, a curtain 86 that has a camouflage pattern is coupled with the frame 24 for hanging in a downward direction generally parallel to the vertical axis A from the frame 24. Specifically, the curtain 86 is coupled with the rear horizontal members 30, the forward members 64 and the front rest members 82. It should be appreciated that the curtain 86 could be coupled with more or fewer components of the hunting blind apparatus 20. The curtain 86 can be used for providing concealment and can act as a barrier from outdoor elements for the user in the blind apparatus 20. It should also be appreciated that the curtain 86 could have various patterns, colors and sizes.

The curtain 86 defines a shooting flap 88 to provide for an opening for the user to shoot through. The shooting flap 88 is defined by a pair of flap sides 90 that extend from the curtain lower portion 92 in spaced and parallel relation with one another to a flap top 94 that extends between the flap sides 90. A pair of zipper chains line the flap sides 90 and the flap tops 94 and a zipper (not shown) slideably engaging the zipper chains for opening and closing the shooting flap 88. It should be appreciated that the shooting flap 88 could have various sizes and shapes.

Figure 5:
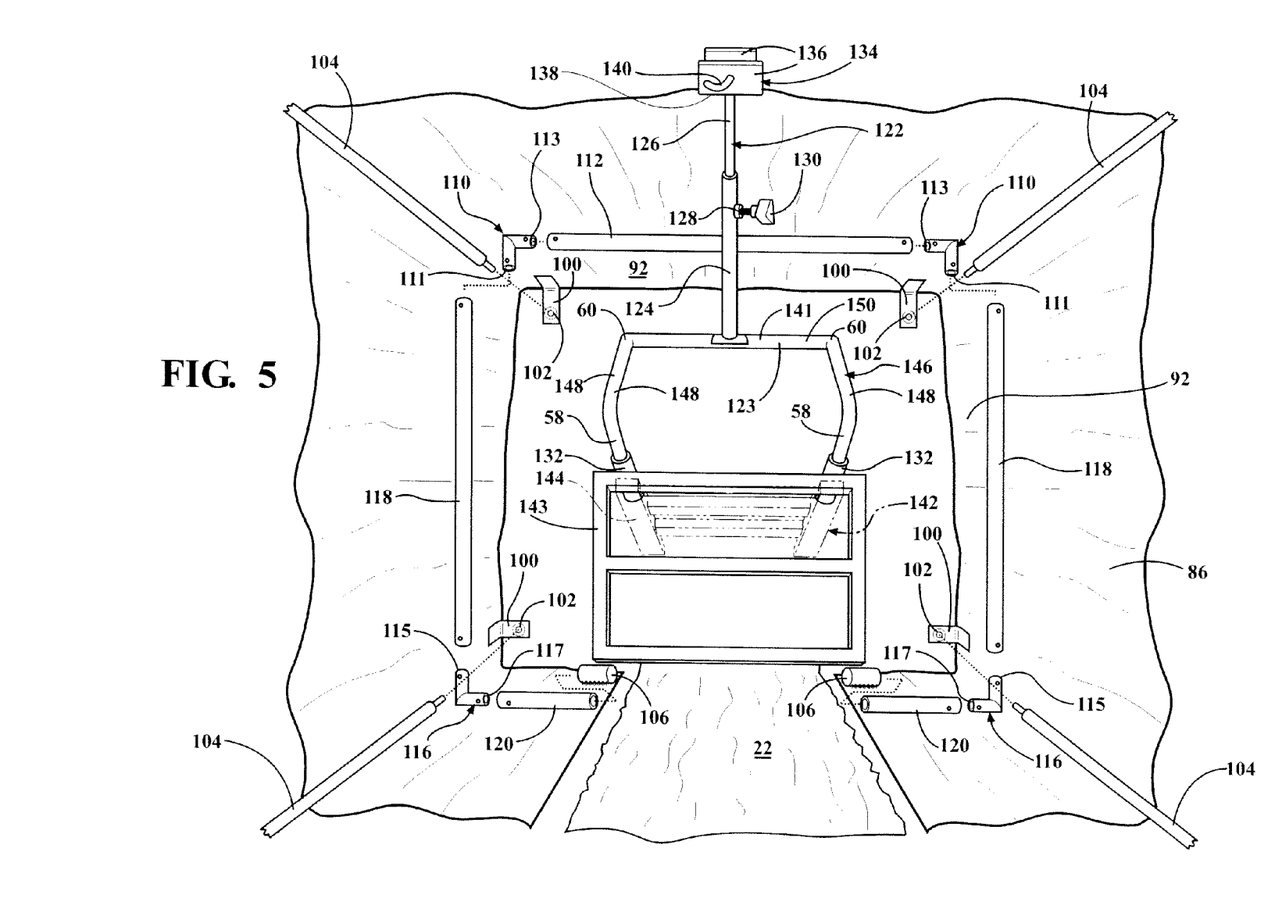
FIG. 5 is top cutaway and partially exploded view of the adjustable blind apparatus coupled with a support.

As best presented in FIG. 5, a lower orifice flap 100 extends away from the curtain lower portion 92 aligned with and spaced in the downward direction from each of the front and rear upper vertical receiving apertures 76, 52 of the front and rear corner mounts 72, 48. Each of the lower orifice flaps 100 define a lower vertical receiving aperture 102. A vertical rod 104 removeably extends between each of the aligned lower vertical receiving apertures 102 and upper vertical receiving apertures 52, 76 for providing rigidity to the curtain 86 parallel to the vertical axis A. It should be appreciated that the vertical rods 104 could be attached to hunting blind in other ways, e.g. by extending through sleeves formed in the curtain 86.

A front dowel receiver 110 that generally has an L-shape is disposed below each of the front corner mounts 72 in the downward direction and is attached to the curtain 86 at the curtain lower portion 92. The front dowel receivers each define a front dowel receiver forward orifice 111 that extends parallel to the forward members 64, and a front dowel receiver horizontal orifice 113 that extends parallel to the front rest member 82. A cylindrical-shaped front dowel 112 is removeably disposed in and extends between e front dowel receiver horizontal orifices 113. It should be appreciated that the front dowel 112 could have various shapes, e.g. a square cross-section.

A rear dowel receiver 116 that generally has an L-shape is generally aligned with and disposed below each of the rear corner mounts 48 in the downward direction and defines a rear dowel receiver forward orifice 115 in alignment with said front dowel receiver forward orifice 111. A cylindrical-shaped forward dowel 118 is removeably disposed in and extends between each set of aligned rear dowel receiver forward orifices 115 and front dowel receiver forward orifices 111. It should be appreciated that the forward dowel 118 could have other shapes, e.g. a square cross-section.

The rear dowel receivers 116 each further define a rear dowel receiver horizontal orifice 117 extending parallel to the rear horizontal members 26. Further, a pair of rear horizontal dowel sleeves 106 that generally have a sleeve-shape are each generally aligned with and disposed below one of the rear horizontal member second portions 34 in the downward direction and attach to the curtain 86 at the curtain lower portion 92. A cylindrical-shaped rear horizontal dowel 120 is removeably disposed in and extend each of the pairs of aligned rear dowel receiver horizontal orifices 117 and the rear horizontal dowel sleeves 106. Accordingly, the front dowel 112, forward dowels 118, and rear horizontal dowels 120 combine to define a lower frame. It should be appreciated that the rear horizontal dowels 120 and rear horizontal dowel sleeves 106 could have various shapes, e.g. a square cross-section, and could engage the curtain in various ways, e.g. being stitched into the curtain.

As best presented in FIGS. 2 and 5, a telescoping adjustment member 122 extends between a stationary surface 123 and the front rest member 82. The adjustment member 122 includes a tube-shaped first leg 124 for engaging the stationary surface and a tube-shaped second leg 126 in telescoping relationship with the first leg 124 and removeably interconnected with the front rest member 82 for moving the front rest member 82 generally parallel to the vertical axis A between various positions to adjust the distance between the curtain 86 and the ground to reinforce the front rest member 82. In other words, the adjustment member 122 is adjustable such that the user can advantageously change the height of the curtain 86 while setting up the hunting blind apparatus 20 to provide for a desired amount of visibility, while the adjustment member 122 also provides support to the front rest member 82 such that it can withstand various forces, e.g. for holding firearms. This adjustment feature is particularly advantageous 20 because it makes the adjustable blind apparatus 20 universal for users of different heights, while still providing necessary support to the front rest member 82.

The second leg 126 includes a threaded locking screw orifice 128 that extends therethrough. A locking screw 130 threadedly extends through the locking screw orifice 128 and engages the first leg 124 for locking the adjustment member 122 in place after adjustment of the adjustment member 122 in the various positions. It should be appreciated that the first and second legs 124, 126 of the adjustment member 122 could be locked relative to one another by other means, e.g. a pin and slot configuration.

The second leg 126 is interconnected with the front rest member 82 with a mounting coupling 134. The mounting coupling 134 has a U-shape and includes a pair of coupling legs 136 that generally extend in spaced and parallel relationship with one another for extending on opposing sides of the front rest member 82, and a coupling base 138 that extends between the coupling legs 136 for engaging the bottom of the front rest member 82 for securing the adjustment member 122 to the front rest member 82. It should be appreciated that adjustment member 122 could be interconnected with the front rest member 82 in other ways, e.g. bolts. A hanging hook 140 extends from one of the coupling legs 136 of the mounting coupling 134. The hanging hook 140 advantageously is centrally located along the front support 22 member such that it can be used by the user of the blind apparatus 20 for hanging supplies, e.g. a bow or backpack.

The stationary point 141 to which the first leg 124 of the adjustment member 122 extends could be at various locations. In the enabling embodiment, stationary point 141 is defined by a foot rest 146 that engages and extends away from a ladder 142 that extends to a tree stand about which the blind apparatus 20 extends. Specifically, the adjustable blind apparatus 20 further includes a pair of tube-shaped ladder slots 132 that extend in spaced and parallel relationship with one another along and in fixed engagement with the rails 144 of the ladder 142. The ladder slots 132 are welded to the ladder 142, but could be fixed to the ladder 142 in other ways, e.g. bolts. The foot rest 146 extends into the ladder slots 132 and advantageously defines the stationary point 141 at a point spaced from the support 22, therefore providing the user with a substantial amount of leg room in the hunting blind apparatus 20. Specifically, the foot rest 146 includes a pair of foot rest legs 148 that each generally have a C-shape and extend from a first foot rest leg portion 58 for slidingly being disposed in one of the ladder slots 132 to a second foot rest leg portion 60 that extends away from the support 22 when the first foot rest leg ends 58 are disposed in the slot 132. A foot rest horizontal member 150 extends between the foot rest legs 148 and defines the stationary point at a central location thereof. Accordingly, the user can use the foot rest horizontal member 150 as a foot rest 146, wherein their feet can engage the foot rest horizontal member 150 on opposing sides of the adjustment member 122. Since the foot rest legs 148 are slidingly disposed in the slots 132, it should be appreciated that, advantageously, only one foot rest leg 148 needs to be disposed in a slot 132 at a time. Therefore, in the configuration in which only one foot rest leg 148 is disposed in a slot 132, the foot rest 146 can be rotated about the slot 132 away from the support 22, to provide space for the user to climb into the blind apparatus 20.

It should be appreciated that the stationary point 141 could also be defined by the ground if the adjustable blind apparatus 20 is interconnected with a support 22 at a location adjacent to the ground. Further, it should be appreciated that the stationary point 141 could be defined by the foot platform 143 of a tree stand that has a relatively large platform. However, it should be noted that "climbing" tree stands generally have a relatively small platform, thus the foot rest 146 configuration can be particularly advantageous for users of these tree stands to provide adequate foot room for the user.

Figure 6:
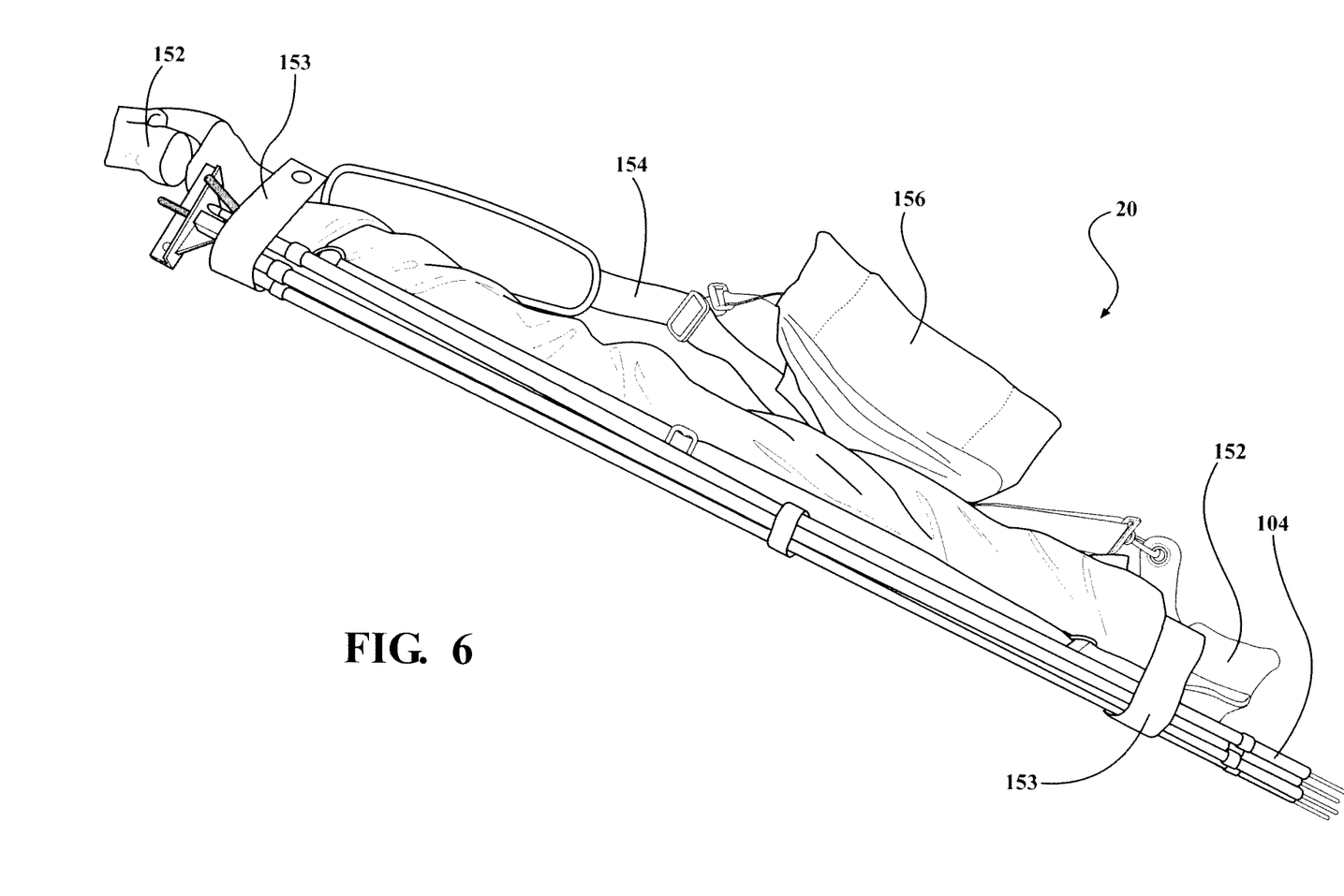
FIG. 6 is a perspective view of the adjustable blind apparatus held in place in a collapsed position by the end caps.

As best presented in FIG. 6, the adjustable blind apparatus 20 is easily collapsible through the removal of the rear horizontal, and forward members 30, 64 as well as the front, rear horizontal and forward dowels 112, 120, 118, and the vertical rods 104 from their associated front and rear corner mounts 72, 48, lower orifice flaps 100, front horizontal dowel receivers 110, and rear dowel receivers 116. In a collapsed position, the front rest, rear horizontal, and forward members 82, 30, 64 as well as the front, rear and horizontal forward dowels 112, 120, 118 all extend in parallel relationship with one another. The hunting blind apparatus 20 further includes a pair of cap-shaped end caps 152 made of a flexible material spaced from one another for holding the aforementioned components in their collapsed position as well as the rear horizontal members 30, the brace pin 42, the rear corner mounts 48, the rear securement pin 65, the front corner mounts 72, the front securement pin 80, the horizontal securement pin 84, the curtain 86 in a secured position as best presented. Further, the vertical rods 104 and front rest member 82 extend adjacent to the end caps 152 and are held in place by a pair of vertical rod straps 153. A shoulder strap 154 is coupled with and extends between the pair of end caps 152 for allowing the user to carry the hunting blind apparatus 20. Further, a component bag 156 is coupled with the shoulder strap 154 for containing the brace members 36 and the strap 44 and the ratchet 46. It should be appreciated that more or fewer of the components could be placed between the end caps 152 or in the component bag 156.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:
1. An adjustable blind apparatus for attaching to a support extending away from a ground along a vertical axis comprising;
    a frame having a frame rear portion including a frame coupling for engaging the support to brace said frame against the support in a direction generally perpendicular to the vertical axis, said frame further including a frame front portion spaced from said frame rear portion, a curtain coupled with said frame for hanging in a downward direction generally parallel to the vertical axis from said frame, an adjustment member including a first leg for engaging a stationary surface and a second leg in telescoping relationship with said first leg including a mounting coupling interconnecting said frame front portion for moving said frame front portion generally parallel to the vertical axis between various positions to adjust the distance between said curtain and the ground to reinforce the front frame front portion, said mounting coupling including a pair of coupling legs generally extending in spaced and parallel relationship with one another for extending on opposing sides of said frame front portion and a coupling base extending between said coupling legs for engaging said frame front portion to interconnect said adjustment member and said frame front portion.

2. The adjustable blind apparatus as set forth in claim 1 and further including a locking screw threadedly extending through said first leg for engaging said second leg for locking said second leg in place after adjustment of said adjustment member in said various positions.

3. The adjustable blind apparatus as set forth in claim 1 and further including a hanging hook extending from one of said coupling legs of said mounting coupling.

4. The adjustable blind apparatus as set forth in claim 1 and further including a foot rest having a pair of foot rest legs each having a first foot rest leg end for being interconnected with a ladder extending to said hunting blind apparatus and a pair of second foot rest leg ends extending away from said first foot rest leg ends respectively, said foot rest further including a foot rest horizontal member extending between said foot rest legs defining said stationary point to position said adjustable member between said foot rest horizontal member and said frame front portion.

5. The adjustable blind apparatus as set forth in claim 4 and further including a pair of ladder slots extending in spaced and parallel relationship with one another for fixedly engaging a pair of rails on the ladder for slideably receiving the first leg ends of said foot rest.

6. An adjustable hunting blind apparatus for attaching to a support extending away from a ground along a vertical axis comprising;

a frame including a frame rear portion including a frame coupling for engaging the support to brace said frame against the support in a direction generally perpendicular to the vertical axis, said frame coupling including pair of rear horizontal members each having a tubular shape with a generally rectangular cross-section for extending perpendicular to the vertical axis on opposing sides of the support from a first rear horizontal member portion toward the support to a second rear horizontal member portion, said frame coupling further including a pair of brace members each telescopingly and removeably extending out of one of said rear horizontal members from said second rear horizontal member portion and including a claw portion extending perpendicular to said leg portion for adjustably engaging supports having different widths to fix the hunting blind apparatus to the support, each of said rear horizontal members and said brace members telescopingly extending therefrom defining a plurality of brace orifices for alignment with one another during extension of said brace members from said horizontal tubes, said frame coupling further including a brace pin removeably extending through one of said pairs of aligned brace orifices for securing said brace members and rear horizontal members in an aligned position relative to one another, said frame coupling further including a strap for wrapping about the support and said claw portions to prevent said brace members from moving relative to the support and a ratchet coupled with said strap for tightening said strap about said brace members and the support, said frame rear portion further including a pair of rear corner mounts each having an L-shape and defining a rear corner mount horizontal leg for removeably extending into one of said first rear horizontal member portions, each of said rear corner mount horizontal legs and said first rear horizontal member portion receiving said rear corner mount leg defining a pair of horizontal leg orifices for alignment with one another, a horizontal leg pin removeably extending through each set of aligned horizontal leg orifices for securing said rear corner mount horizontal leg and said first rear horizontal member portions, and further defining a rear upper vertical receiving aperture for extending parallel to the vertical axis and a rear corner mount forward leg extending perpendicular to said rear corner mount horizontal leg and said rear upper vertical receiving aperture, said frame further including a pair of forward members each having a tubular shape and a rectangular-shaped cross-section extending from a first forward member portion coupled with said frame coupling to a second forward member portion, said coupling of said pair of forward members to said frame coupling including each of said first forward member portions removeably receiving one of said rear corner mount forward legs of one said rear corner mounts, each of said rear corner mount legs and said forward member receiving said rear corner mount forward legs defining a rear securement orifice for alignment with one another, a rear securement pin removeably extending through said aligned rear securement orifices of each of said rear corner mount forward legs and said forward members for securing said rear corner mount leg extending into said forward member, said frame further including a frame front portion spaced from said frame rear portion by said forward members, said frame front portion including a pair of front corner mounts each having an L-shape and defining a front corner mount forward leg for removeably extending into one of said second forward member portions and a front upper vertical receiving aperture for extending parallel to said vertical axis and a front corner mount horizontal leg extending perpendicular to said front corner mount forward leg and said front upper vertical receiving aperture, each of said front corner mount forward legs and said forward member receiving said front corner mount forward legs defining a front securement orifice for alignment with one another, a front securement pin removeably extending through said aligned front securement orifices of each of said front corner mount forward legs and said forward members receiving said front corner mount forward leg for securing said front corner mount to said forward member, said frame front portion further including a front rest member having a tubular shape and a rectangular cross-section removeably receiving and extending between said front corner mount horizontal legs of said front corner mounts, each of said front corner mount horizontal legs and said front rest member receiving said front corner mount horizontal legs defining a horizontal securement orifice for alignment with one another, a horizontal securement pin removeably extending through said horizontal securement orifices of each of said front corner mount horizontal legs and said front rest member receiving said front corner mount horizontal legs for securing said front corner mount to said front rest member, a curtain having a camouflage pattern coupled with said frame for hanging in a downward direction generally parallel to the vertical axis from said frame, said coupling of said curtain and said frame including said curtain being coupled with said rear horizontal members and said forward members and said front rest members, said curtain defining a shooting flap defined by a pair of flap sides extending from said curtain lower portion in spaced and parallel relation to one another to a flap top extending between said flap sides, a pair of zipper chains lining said flap sides and said flap tops, a zipper slideably engaging said zipper chains for opening and closing said shooting flap, a lower orifice flap extending away from said curtain lower portion aligned with and spaced in said downward direction from each of said front and rear upper vertical receiving apertures of said front and rear corner mounts, each of said lower orifice flaps defining a lower vertical receiving aperture, a vertical rod removeably extending between each of said aligned lower vertical receiving apertures and said upper vertical receiving apertures for providing rigidity to said curtain, a front dowel receiver generally having an L-shape disposed below each of said front corner mounts in said downward direction and attached to said curtain at said curtain lower portion, said front dowel receiver defining a dowel receiver orifice extending parallel to said front rest member, a front dowel having a cylindrical-shape removeably disposed in and extending between said front dowel receiver horizontal orifice, a rear dowel receiver generally having an L-shape disposed below each of said rear corner mounts in said downward direction and attached to said curtain at said curtain lower portion, said rear dowel receiver defining a rear dowel receiver forward orifice in alignment with said front dowel receiver forward orifice, a forward dowel having a generally cylindrical shape removeably siaposed in and extending between each of said aligned rear dowel receiver forward orifices and said front dowel receiver forward orifices, said rear dowel receivers each further defining a rear dowel receiver horizontal orifice extending parallel to said rear horizontal members, a pair of rear horizontal dowel sleeves generally having a sleeve-shape each disposed in said downward direction below one of said rear horizontal member second portions and attached to said curtain at said curtain lower portion and aligned with one of said rear dowel receiver horizontal orifices, a rear horizontal dowel removeably disposed in and extending between each of said aligned rear dowel receiver horizontal orifices and said rear horizontal dowel sleeves, an adjustment member including a first leg having a tube-shape for engaging a stationary surface and a second leg having a tube-shape in telescoping relationship with said first leg including a mounting coupling being coupled with said front rest member for moving said front rest member generally parallel to the vertical axis between various positions to adjust the distance between said curtain and the ground to reinforce the front rest member, said second leg including a locking screw orifice being threaded extending therethrough, a locking screw threadedly extending through said locking screw orifice and engaging said first leg for locking said adjustment member in place after adjustment of said adjustment member in said various positions, said mounting coupling having a U-shape including a pair of coupling legs generally extending in spaced and parallel relationship with one another for extending on opposing sides of said front rest member and a coupling base extending between said coupling legs for extending below said front rest member for securing said adjustment member to said front rest member, a hanging hook extending from one of said coupling legs of said mounting coupling, a pair of end caps having a cap shape and made of a flexible material spaced from one another for holding said rear horizontal members and said brace pin and said rear corner mounts and said forward members and said rear securement pin and said front corner mounts and said front securement pin and said horizontal securement pin and said curtain and said front dowel and said forward dowels and said rear horizontal dowels and said adjustment member therebetween, a pair of vertical rod straps for being wrapped about said front rest member and said vertical rod and said end caps, a shoulder strap coupled with and extending between said pair of endcaps, and a component bag coupled with said shoulder strap for containing said brace members and said strap and said ratchet.

7. The adjustable blind apparatus as set forth in claim 6 and further including a pair of ladder slots extending in spaced and parallel relationship with one another and each for fixedly engaging a rail of a ladder extending to said hunting blind apparatus, a foot rest having a pair of foot rest legs each generally having a C-shape extending from a first foot rest leg end for slidingly being disposed in one of said ladder slots to a second foot rest leg end extending away from said support when said first foot rest leg ends are disposed in said slot, said foot rest further including a foot rest horizontal member extending between said foot rest legs, said stationary point being defined by said foot rest horizontal member to position said adjustable member at a distance away from the support.

* * * * *